Nov. 23, 1943.    J. ETTL    2,335,178
METHOD OF COATING STRIP MATERIAL
Original Filed April 30, 1937    2 Sheets-Sheet 1
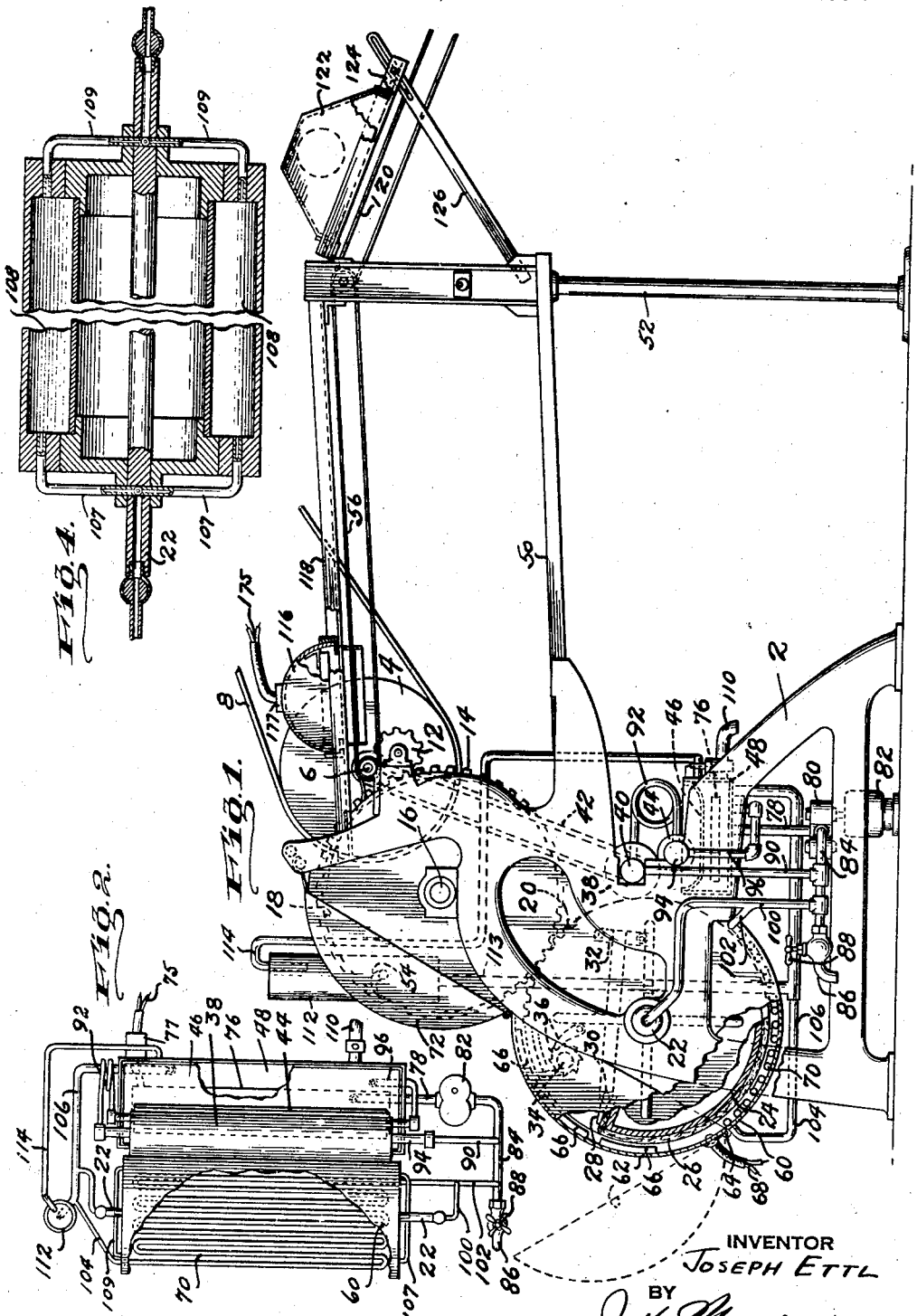
INVENTOR
JOSEPH ETTL
BY
*Jos. L. Montgomery*
ATTORNEY

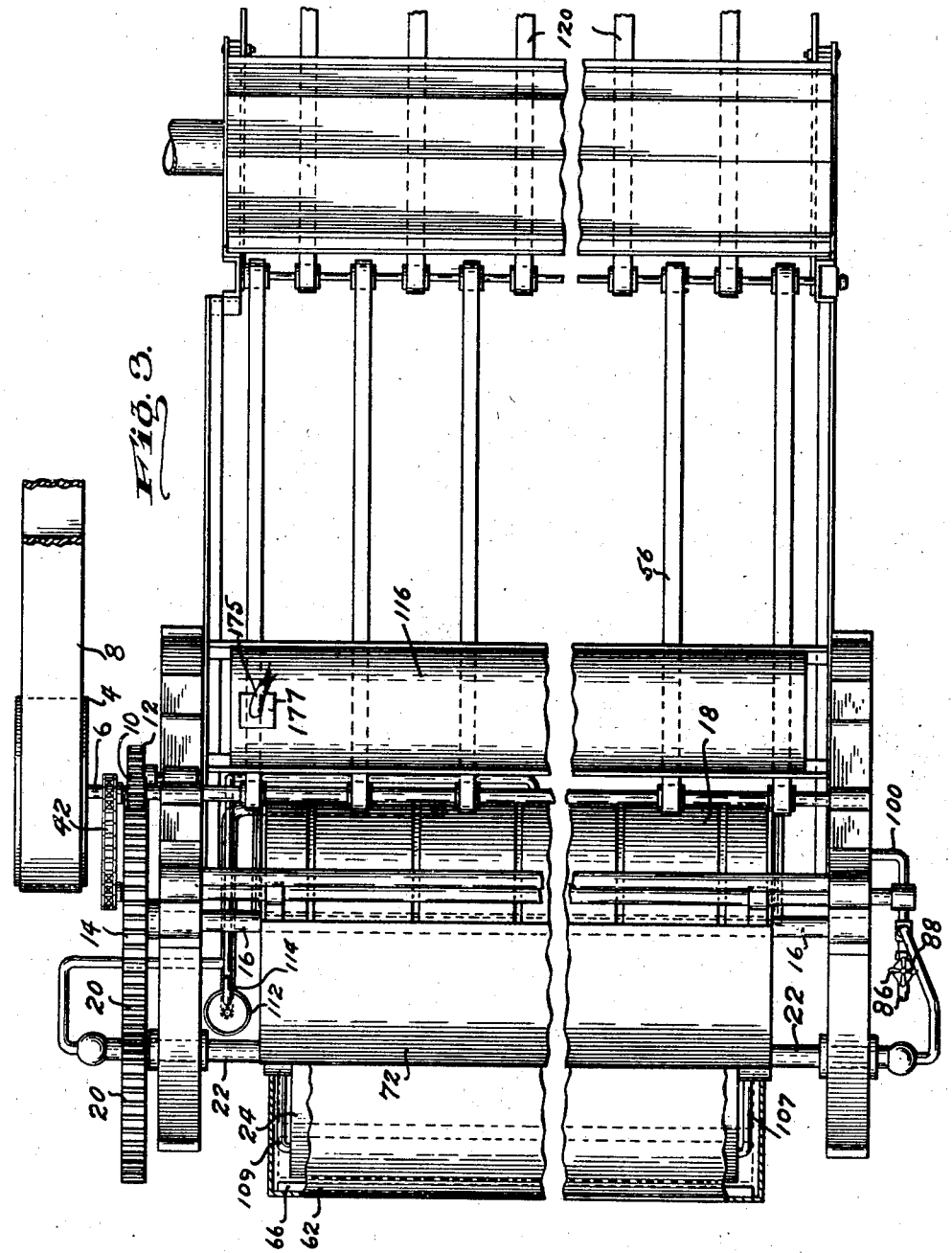

Patented Nov. 23, 1943

2,335,178

UNITED STATES PATENT OFFICE 2,335,178

METHOD OF COATING STRIP MATERIAL

Joseph Ettl, Highlands, N. J., assignor to Potdevin Machine Company, Brooklyn, N. Y., a corporation of New York Original application April 30, 1937, Serial No. 139,907. Divided and this application September 19, 1942, Serial No. 458,953

6 Claims. (Cl. 117—103)

This invention relates to the method of handling strip material and is particularly directed to the application of coating material, such as adhesive, glue, varnish and the like, to the face of paper strips or other material as the same are fed through a machine.

More specifically, the invention relates to a method wherein the material being applied to the strips is heated and the strips to which the material is applied are likewise heated during the application of the coating material to the strips.

This application is a division of my co-pending application, Serial No. 139,907, filed April 30, 1937.

One of the objects of the present invention is the provision of a method wherein heated fluid, such as oil, for example, is heated by electric means and is circulated in such a manner as properly to heat the strips as the same are passed through a machine to set the coating material which has been applied thereto.

Another object of the present invention resides in the provision of a method of applying coating material to paper, for example, wherein the heat employed is from a source external to the rollers of the press or machine.

A still further object of the invention resides in the provision of a method for maintaining the strips heated until the same pass out of the machine to a chilling device where the coating material is finally set.

Other objects of the present invention will be manifest from the following description and the accompanying drawings, wherein I have illustrated an apparatus for carrying out my improved method.

In the drawings:

Fig. 1 is a side elevation of the apparatus;

Fig. 2 is a plan view of the same with the upper cylinder and other parts removed for clarity of illustration;

Fig. 3 is a plan view of the machine; and

Fig. 4 is a sectional view of the heated blanket roller or plate cylinder.

Referring to the drawings in detail: 2 designates a frame or support for the device having a pulley 4 mounted on a shaft 6 and driven from a suitable source (not shown) through a belt 8.

The shaft 6 carries a pinion 10 meshing with another pinion 12 which in turn is in mesh with a gear 14 on a shaft 16 carrying upper feed or backing roller or cylinder 18.

The gear 14 meshes with a gear 20 mounted on shaft 22 carrying a lower plate cylinder or blanket roller 24. This roller is provided with a removable blanket 26, secured at one end to the roller by a clamp 28 which is pivoted at 30 and latched in clamping position by means of latch 32. The other end of the blanket is wound on a rod 34 having a pawl and ratchet arrangement 36 associated therewith for the purpose of tightening the blanket about the roller.

The blanket 26 receives coating material from a coating-applying or form roller 38 mounted on a shaft 40 which is driven by means of a sprocket chain 42 from the shaft 6. The form roller 38 receives the coating material from a fountain roller 44 which dips into a tank 46 formed in the concaved cover of an enclosed heated oil tank 48 which will be described presently.

A table 50 is provided for feeding the strips of material to the machine. This table is supported at one end by the frame 2 of the machine and at its other end by a support 52. As the strips are fed from the table between the backing cylinder or roller 18 and the plate cylinder or roller 24 the blanket 26 contacts the lower face of the strips and applies the coating material thereto. As the strips pass between the rollers the forward end thereof is gripped by a gripper 54 carried by the backing roller 18 in the usual manner and conveyed about the roller 18 and deposited on a conveyor belt 56, which conveys the same out of the machine.

The plate cylinder 24 is enclosed in a cylindrical housing 60, provided with a cover or door 62 hinged thereto at 64 to provide ready access to the blanket. This cover is provided with electric heating elements 66 receiving current from any suitable source of power through conductors 68. The cylindrical housing 60 also encloses a series of heating coils 70 through which heated oil or other fluid is circulated. The electric heating elements 66 and the heating coils 70, it will be appreciated, will maintain the blanket 26 in heated condition during the rotation of the roller.

The backing roller 18 is provided with a hinged cover or door 72 similar to the door 62 of the plate cylinder 24 whereby inspection may readily be made.

When oil is used as the heating medium it is heated in the closed tank 48 by means of an immersed electric heating element 76 which receives its energy from any suitable source through the conductors 75. A thermostatic switch may be provided in housing 77 for regulating or controlling the heat of the fluid in the tank 48.

A fluid conduit 78 leads from the bottom of the tank 48 to the intake side of a pump 80 driven by a nelectric motor 82. When the pump 80 is not in operation the fluid obviously will be retained in the tank 48 and the conduit 78.

Connected to the outlet side of the pump 80 is a conduit 84 provided with several branch lines. One of these lines leads to a drain 86 which when the valve 88 thereof is open will allow the tank 48 and all of the conduits hereinafter described to be drained of oil by driving the pump 80. Another branch line 90 leads to one end of the hollow shaft 40 of the form roller 38, the heating fluid passing out of this shaft at the other end through a coiled conduit 92 connected to one end of hollow shaft 94 of the roller 44, thence through the conduit 96 back to the tank 48. Another branch line leads from the pump 80 to the conduit 100, one branch 102 of which leads through the heating coils 70 in the blanket roller housing, thence through conduit 104 into the return line 106 and back to the tank 48. The other branch of the conduit 100 leads to the hollow shaft 22 of the cylinder 24 and as shown in Fig. 4 communicates with four branches 107, each leading to one of four chambers 108 in the plate cylinder. The fluid passing into these chambers serves to heat the plate cylinder from the interior and passes out of the chambers through branches 109 to return line 106 back to the tank 48. The tank 48 may be drained at 110 when the pump 80 is not in operation. The tank 48 is supplied with oil or other fluid from the filler tank 112 which has a conduit 113 in its lower end in communication with the return line 106 leading to the tank 48. The filler tank is also provided with an overflow line 114 communicating directly with the tank 48.

When the strips of material pass between the rollers or cylinders 18 and 24 and are deposited on the conveyor belt 56 they are subjected to further heat treatment. For this purpose I provide a heater 116 which is mounted on rails 118 directly above the conveyor belt 56. This heater receives its current through conductors 175 and may be controlled by thermostat 177.

The strips pass from the conveyor belt 56 to another conveyor belt 120, and as they are received by this last mentioned belt are subject to a chilling action to finally set the coating material which has been applied thereto. 122 designates the chilling unit which may be of any suitable type and which is mounted on a bracket 124 and hinged to the machine frame, the other end of the bracket 124 being supported on an adjustable bracket 126 whereby the chilling unit may be moved toward and away from the conveyor belt 120.

From the foregoing it will be appreciated that when the oil in the tank 48 is heated by means of the heating element 76 the heat will be transferred to the concaved cover containing the coating material whereby the same will be maintained in a heated condition. The oil, as will be appreciated, is pumped from the tank through the various conduits described for the purpose of heating the blanket and the various rollers mentioned when the machine is in operation. The heating elements 66 in the cover of the blanket roller are electric heating elements. I prefer this arrangement rather than employing the heating pipes in the cover as a more convenient form. It will be appreciated, however, that the heating elements 66 will provide a continuity of heating surface for the blanket during its rotation.

It will also be appreciated that when the oil is drained from the conduits as hereinbefore described the sole heating means for the fountain, rollers and cylinders will be the heating means for the fountain to maintain fluidity of its contents and the external radiant heating means for the cylinders.

The method of the present invention as will readily be understood from the foregoing comprises the steps of heating the coating material in the tank 46 to a predetermined temperature, transferring the heated coating material to the form roller 44 thence to the plate cylinder 24 where it is applied to the strips of material fed between the rollers 18 and 24. The coated sheets are then deposited in the conveyor 120 and chilled by the chilling unit 122.

When the oil is circulated through the conduits as hereinbefore described the rollers and cylinders are heated internally in addition to the extreme heating hereinbefore described.

It is to be understood that while I have described a preferred apparatus for carrying out my improved method and a preferred order of performing the steps of the method I do not wish to be limited thereto as obviously variations may be made therein without departing from the spirit and scope of my invention.

What I claim is:

1. The method of applying coating material to paper comprising the following steps: heating the coating material to a predetermined temperature, transferring the hot coating material to a printing mechanism, applying radiant heat from an external source to the said printing mechanism, the heat which originally melts the coating material and said radiant heat constituting the sole heat used in the process.

2. The method of applying coating material to paper comprising the following steps: heating the coating material to a predetermined temperature, transferring the hot coating material to a printing cylinder, applying radiant heat from an external source to said printing cylinder, the heat which originally melts the coating material and said radiant heat constituting the sole heat used in the process.

3. The method of applying coating material to paper comprising the following steps: heating the coating material to a predetermined temperature, transferring the hot coating material to a printing mechanism, applying radiant heat from an external source to the said printing mechanism, the heat which originally melts the coating material and said radiant heat constituting the sole heat used in the process, the said radiant heat applied from an external source heating at least a portion of the exterior of the printing cylinder.

4. The method of applying coating material to paper comprising the following steps; heating the coating material to a predetermined temperature, transferring the hot coating material to a printing cylinder, applying radiant heat from an external source to the said printing cylinder, the heat which originally melts the coating material and said radiant heat constituting the sole heat used in the process, the said radiant heat applied from an external source heating at least a portion of the exterior of the printing cylinder.

5. The method of applying coating material to strips of material comprising the following steps: heating the coating material to a predetermined temperature, transferring the hot coating material to the exterior of an internally heated cylinder while rotating the cylinder, and moving a strip of material to be coated in contact with the periphery of said cylinder while applying radiant heat from an external source to said strip of material.

6. The method of applying coating material to strips of material comprising the following steps: heating the coating material to a predetermined temperature, transferring the hot coating material to the exterior of an internally heated cylinder while rotating the cylinder, moving a strip of material to be coated into contact with the periphery of said cylinder while applying radiant heat to said strip of material from a source external to said cylinder and finally chilling the said strip whereby to set the coating material.

JOSEPH ETTL.